United States Patent
Song

(10) Patent No.: US 9,366,590 B2
(45) Date of Patent: Jun. 14, 2016

(54) TORQUE SENSOR FOR MEASURING TORSION OF STEERING COLUMN AND MEASUREMENT METHOD USING THE SAME

(71) Applicant: Tyco Electronics AMP Korea Ltd., Kyungsanbuk-Do (KR)

(72) Inventor: Kwang Ho Song, Kyungsangbuk-Do (KR)

(73) Assignee: Tyco Electronics AMP Korea Ltd., Kyungsangbuk-Do (KR)

(*) Notice: Subject to any disclaimer, the term of this patent is extended or adjusted under 35 U.S.C. 154(b) by 0 days.

(21) Appl. No.: 14/298,064

(22) Filed: Jun. 6, 2014

(65) Prior Publication Data

US 2014/0283623 A1 Sep. 25, 2014

Related U.S. Application Data

(63) Continuation of application No. PCT/KR2012/009848, filed on Nov. 21, 2012.

(30) Foreign Application Priority Data

Dec. 6, 2011 (KR) .................. 10-2011-0129618

(51) Int. Cl.
*G01L 3/02* (2006.01)
*G01L 3/10* (2006.01)
*B62D 6/10* (2006.01)

(52) U.S. Cl.
CPC . *G01L 3/101* (2013.01); *B62D 6/10* (2013.01); *G01L 3/104* (2013.01)

(58) Field of Classification Search
CPC ......... G01L 3/101; G01L 3/104; G01L 3/102; G01D 5/2046; B62D 6/10

USPC .................. 73/862.331–862.335, 862.193
See application file for complete search history.

(56) References Cited

U.S. PATENT DOCUMENTS

| | | | | |
|---|---|---|---|---|
| 4,837,493 A * | 6/1989 | Maeno et al. | ................. | 318/685 |
| 6,770,995 B1 * | 8/2004 | Foshage | ............. | F16C 32/0414 310/90.5 |
| 7,089,809 B2 | 8/2006 | Nakane et al. | | |
| 7,124,649 B2 | 10/2006 | May | | |
| 8,575,871 B1 * | 11/2013 | Moore | ........................ | 318/254.1 |
| 8,836,463 B2 * | 9/2014 | Ikriannikov | ............... | H01F 3/14 336/222 |
| 2009/0027045 A1 * | 1/2009 | Islam et al. | ............... | 324/207.13 |
| 2011/0036182 A1 | 2/2011 | Sasanouchi et al. | | |
| 2011/0278975 A1 * | 11/2011 | Holcomb | ............... | H02K 16/02 310/113 |
| 2013/0181549 A1 * | 7/2013 | Benner, Jr. | ............. | H02K 33/16 310/38 |

FOREIGN PATENT DOCUMENTS

| | | | |
|---|---|---|---|
| EP | 1870684 A1 | | 12/2007 |
| JP | 60204249 A | * | 10/1985 |
| JP | 2004072869 A | * | 3/2004 |
| JP | 2008216019 A | | 9/2008 |
| KR | 1020070043000 A | | 4/2007 |
| KR | 100779492 B1 | | 11/2007 |

* cited by examiner

*Primary Examiner* — Max Noori
(74) *Attorney, Agent, or Firm* — Barley Snyder

(57) ABSTRACT

A torque sensor is provided and includes a rotor and stator. The rotor includes a plurality of magnet, while the stator includes a plurality of teeth respectively corresponding to the plurality of magnets. A magnetic flux is provided by the plurality of teeth and the plurality of magnets and flows in one direction.

31 Claims, 17 Drawing Sheets

TORQUE SENSOR FOR MEASURING TORSION OF STEERING COLUMN AND MEASUREMENT METHOD USING THE SAME

CROSS-REFERENCE TO RELATED APPLICATIONS

This application claims the benefit of the filing date under 35 U.S.C. §119(a)-(d) of PCT Patent Application No. PCT/KR2012/009848 filed on Nov. 21, 2012, which claims priority under 35 U.S.C. §119 to KR Patent Application No. 10-2011-0129618, filed Dec. 6, 2011.

FIELD OF THE INVENTION

The present invention relates to a sensor and, in particular, to a torque sensor for measuring torsion of a steering column.

BACKGROUND

Generally, a vehicles front wheels rotates in association with the steering wheel. That is, when the steering wheel is rotated leftward, the vehicle wheels rotate leftward. When the steering wheel is rotated rightward, the vehicle wheels rotate rightward.

However, since the vehicle wheels are in contact with a road surface, a rotational angle of the steering wheel may vary due to friction between the vehicle wheels and the road surface. That is, when the steering system of the vehicle steers the vehicle wheels by rotating the steering wheel, friction operates between the vehicle wheels and the road surface, causing a difference in a rotational angle between the steering wheel and the vehicle wheels. Accordingly, a rotational deflection is generated.

Taking this into consideration, most steering systems adopt an electronic power steering (EPS) system that measures rotational deflection using a torque sensor and supplies a dedicated rotational force to an output shaft corresponding to the measured rotational deflection, thereby compensating for the rotational deflection.

Since the EPS system measures the rotational deflection between a steering wheel and a wheel using the torque sensor and rotates the vehicle wheels using a dedicated power unit by as much as the measured rotational deflection, the vehicle may be steered safely and accurately in a desired direction.

A known EPS system is shown in FIG. 1 with a steering column having an input shaft 10 connected with a steering wheel, an output shaft 20 connected with a pinion gear 21 which is meshed with a rack bar of a tie rod of a wheel, and a torsion bar 30 coaxially connecting the input shaft 10 with the output shaft 20.

In the known EPS system, when resistance between the vehicle wheels and a road surface is great, the input shaft 10 is rotated more than the output shaft 20. Accordingly, the torsion bar 30 is twisted, which may be detected using a torque sensor with magnet detection rings 41, 42, and 43 and an electrical signal is input to an electronic control unit (ECU). The input electrical signal is calculated in the ECU, thereby driving an auxiliary power unit (APU). Thus, deficiency of the rotational angle of the output shaft 20 may be compensated.

The torque sensor generally used in the EPS system may include a contact type sensor which directly measures deformation of the torsion bar, such as a strain gauge and a potentiometer, and a non-contact type sensor which indirectly measures deformation of the torsion bar using a magnetic or optical method.

FIG. 2 shows a known non-contact torque sensor that includes a ring-type rotor 50 connected with an input shaft and on which a multi pole magnet 51 including N poles and S poles alternately polarized in a circumferential direction is arranged, and stators 52 and 53 connected with an output shaft and divided into an upper part and a lower part to respectively include protrusions 52a and 53a corresponding to the multi pole magnet 51 and recessed sections 52b and 53b relatively recessed with respect to the protrusions 52a and 53a. A collector unit 30 may be provided between the stators 52 and 53, to form a circuit for flow of a magnetic flux. In the known non-contact torque sensor, when a torsion bar is twisted by rotation of a steering wheel, the rotor 50 and the stators 52 and 53 are rotated relative to one another. At this time, relative positions of the multi pole magnet 51 and the protrusions 52a and 52b are changed. Therefore, the known non-contact torque sensor may measure a rotational deflection of an input shaft and an output shaft by detecting density of a magnetic flux flowing to the collector unit 30.

FIGS. 3A to 3C show a flow of a magnetic flux according to positions of the protrusions and the rotor of the known non-contact torque sensor shown in FIG. 2. As shown in FIG. 3A, when the protrusions 52a and 52b overlap with the N poles and the S poles by the same area, almost no magnetic flux flows to the collector unit 30.

However, when the N poles overlap the protrusion 52a of an upper stator 52 while the S poles overlap the protrusion 53a of a lower stator 53 as shown in FIG. 3B, a magnetic flux emitted from the N poles flows to the upper stator 52 through the protrusion 52a of the upper stator 52 and the magnetic flux flowed to the upper stator 52 flows to the lower stator 53 through the collector unit 30 and then is collected to the S poles. That is, in the case as shown in FIG. 3B, the magnetic flux flowing in the collector unit 30 may flow downward.

In addition, as shown in FIG. 3C, when the S poles overlap the protrusion 52a of the upper stator 52 while the N poles overlap the protrusion 53a of the lower stator 53, a magnetic flux emitted from the N poles flows to the lower stator 53 through the protrusion 53a of the lower stator 53. The magnetic flux flowed to the lower stator 53 flows to the upper stator 52 through the collector unit 30 and then is collected to the S poles. That is, in the case as shown in FIG. 3C, the magnetic flux flowing in the collector unit 30 may flow upward.

Thus, in a known magnetic sensor provided to the collector unit 30 to measure density of the magnetic flux, directions of the magnetic flux alternate upward and downward according to rotation of the rotor. Therefore, a hysteresis loss is increased.

SUMMARY

An aspect of the invention, among others, is to provide a torque sensor to measure torsion of a steering column and having a rotor and stator. The rotor includes a plurality of magnet, while the stator includes a plurality of teeth respectively corresponding to the plurality of magnets. A magnetic flux is provided by the plurality of teeth and the plurality of magnets and flows in one direction.

BRIEF DESCRIPTION OF THE DRAWINGS

The invention will now be described by way of example with reference to the accompanying figures, of which.

DETAIL DESCRIPTION OF THE EMBODIMENT(S)

Figure 1:
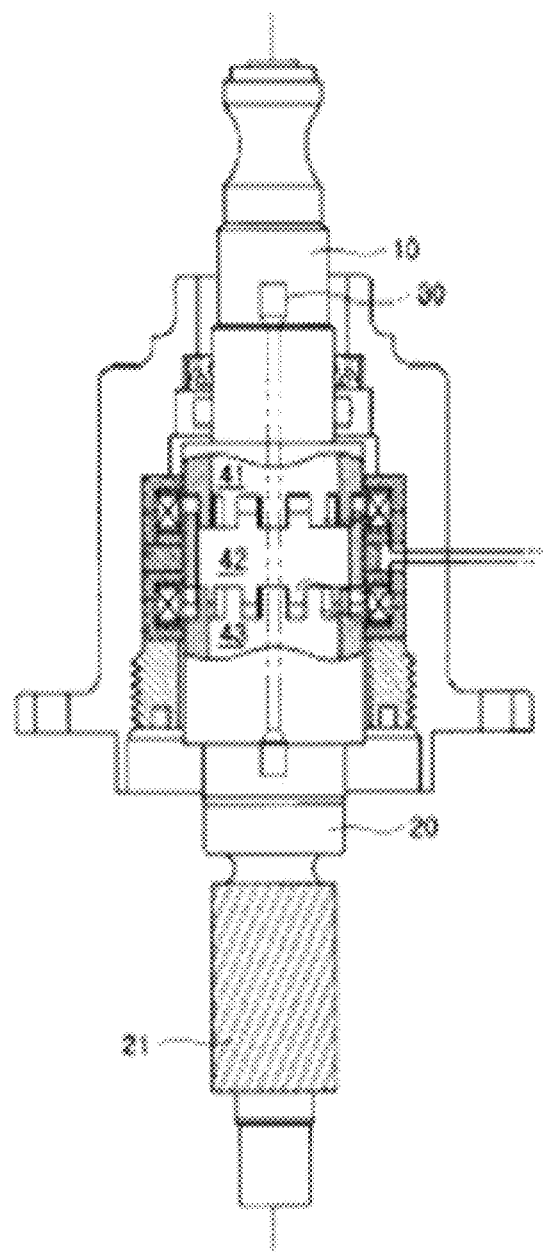
FIG. 1 is a sectional view of a known EPS system.
Figure 2:
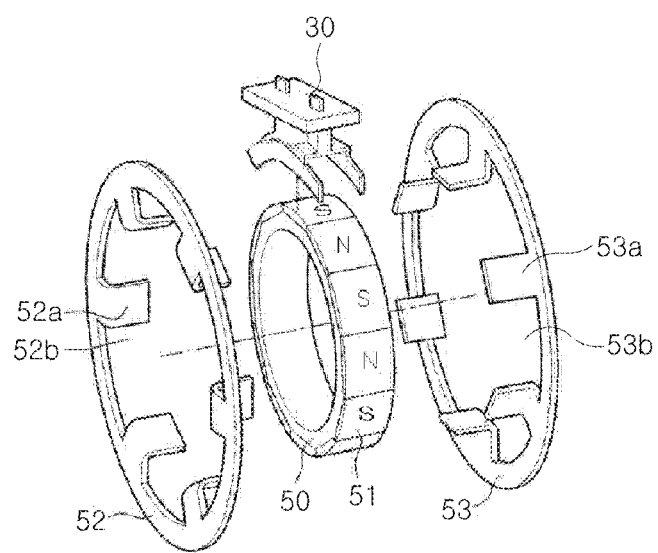
FIG. 2 is an exploded perspective view a known non-contact torque sensor.
Figure 3A:
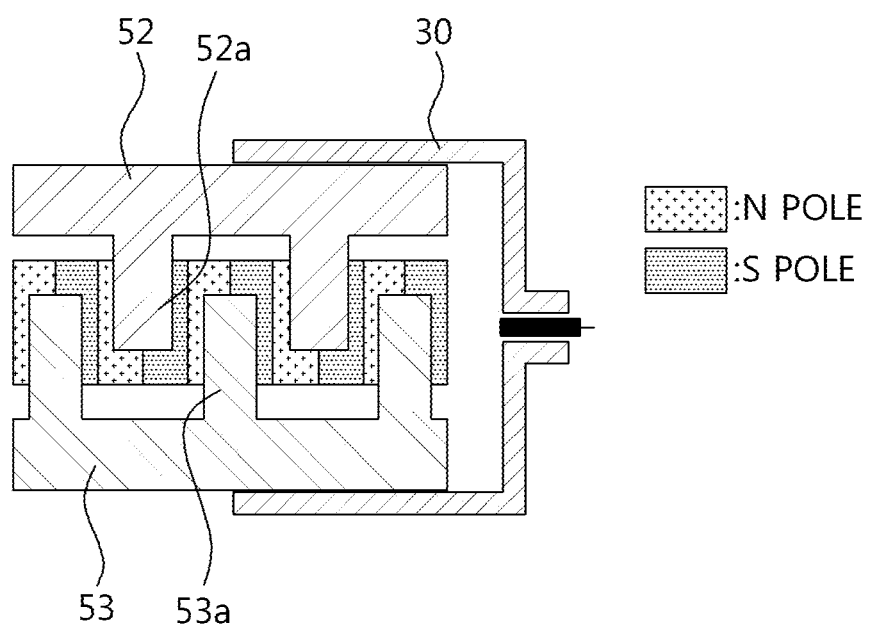
FIGS. 3A to 3C are schematic diagrams shown flow of magnetic flux according to positions of protrusions and a rotor of the known non-contact torque sensor shown in FIG. 2.
Figure 3B:
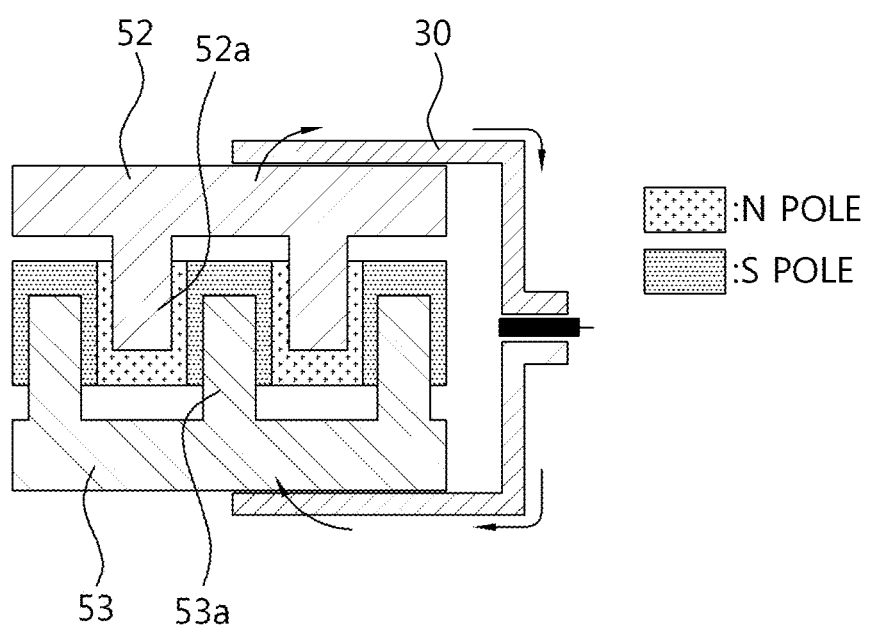
Figure 3C:
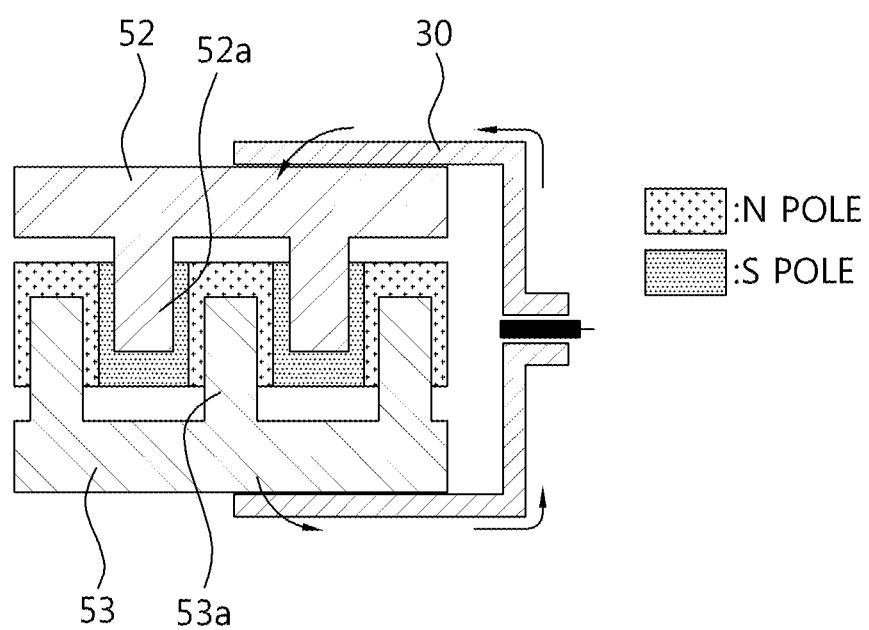

Reference will now be made in detail to a torque sensor according to the invention used for measuring torsion of a steering column. Each of the described examples are illustrated in the accompanying drawings, wherein like reference numerals refer to the like elements throughout. The embodiments are described below in order to explain the invention by referring to the figures.

Figure 4:
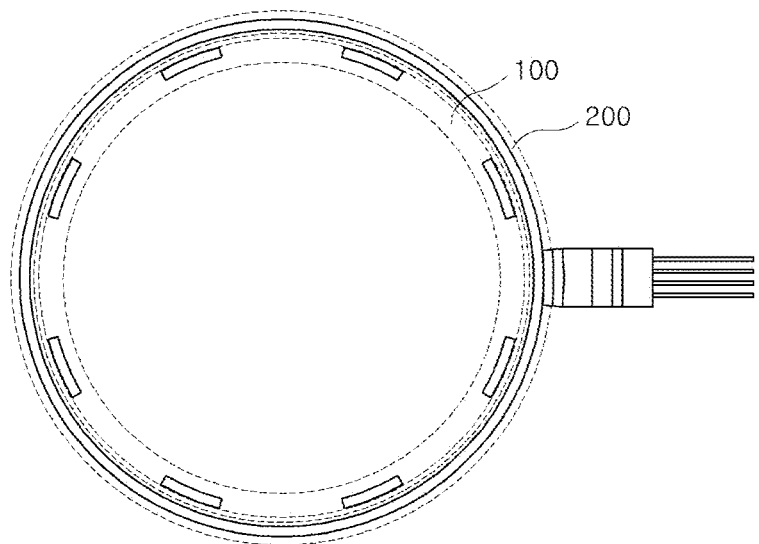
FIG. 4 is a plan view of a torque sensor according to the invention.

As shown in FIG. 4, the torque sensor may include a rotor 100 and a stator 200 mounted to an outside of the rotor 100.

The rotor 100 and the stator 200 are connected to only one of: an input shaft (not shown) and an output shaft (not shown) being coaxially connected.

Figure 5:
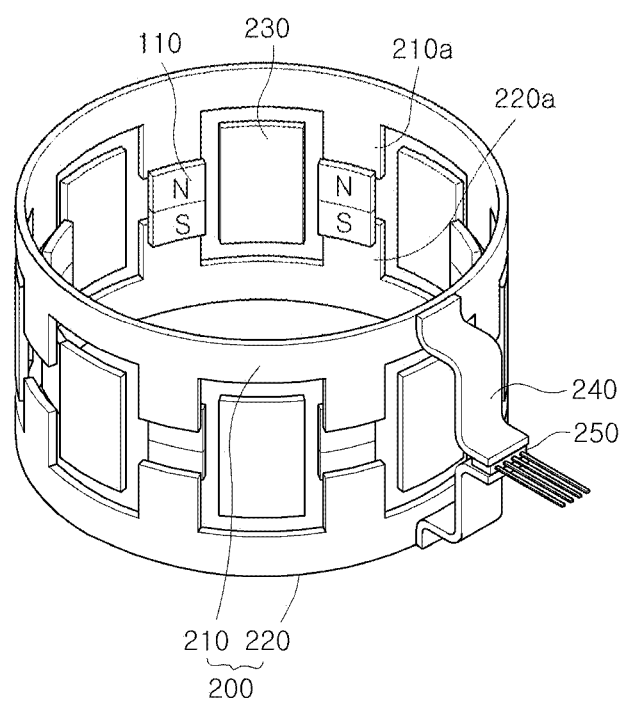
FIG. 5 is a perspective view of the torque sensor shown in FIG. 4.

As shown in FIG. 5, the stator 200 may be coupled to and integrally rotated with the input shaft or the output shaft. The stator 200 may be divided into an upper portion and a lower portion which are coaxially and separately arranged. That is, the stator 200 may include an upper stator 210 and a lower stator 220. The upper stator 210 and a lower stator 220 each include a plurality of teeth 210a and 220a, respectively, correspondingly extending toward each other. That is, the teeth 210a of the upper stator 210 extend downward while the teeth 220a of the lower stator 220 extend upward such that the teeth 210a and the teeth 220a face each other. A gap is provided between a free end of each of the teeth 210a of the upper stator 210 and a free end of each of the teeth 220a of the lower stator 220, with the free ends facing each other. A shielding magnetic body 230 is mounted in the gap formed between the plurality of teeth 210a and 220a facing each other. The shielding magnetic body 230 induces the magnetic flux generated from magnets 110 that will be described later. Since the stators 210 and 220 and the shielding magnetic body 230 are insert molded using an insulating material, configuration set during manufacturing is not changed.

Additionally, a collector unit 240 is provided between the upper stator 210 and the lower stator 220 to magnetically connect the upper stator 210 and the lower stator 220 to each other. The collector unit 240 is connected to the upper stator 210 with one end and connected to the lower stator 220 with an opposite end, accordingly functioning as a magnetic path between the upper stator 210 and the lower stator 220. The collector unit 240 may include a magnetic sensor 250 to detect density of the magnetic flux flowing through the collector unit 240.

As shown in FIG. 5, the rotor 100 may be connected to and integrally rotated with the input shaft or the output shaft, which is not connected with the stator 200. The rotor 100 may include a plurality of the magnets 110 arranged at intervals corresponding to intervals of the teeth 210a and 220a respectively of the stators 210 and 220. Here, each of the magnets 110 is polarized in a vertical direction. According to the shown embodiment, in the magnet 110, an upper portion is an N pole and a lower portion is an S pole. Since the magnets 110 are insert molded using an insulating material, configuration set during manufacturing is not changed. Although the magnet 110 has the N pole at the upper portion and the S pole at the lower portion in this embodiment, positions of the N pole and the S pole may be reversed.

Figure 6:
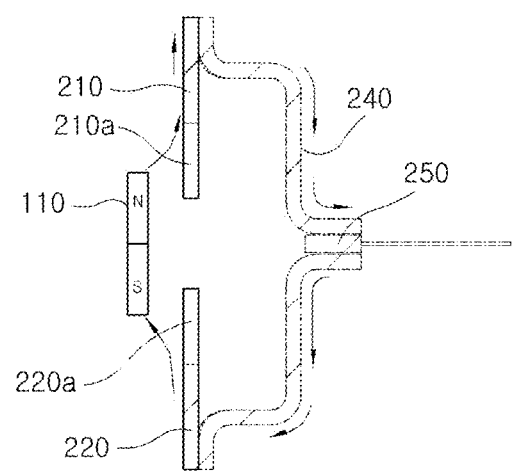
FIG. 6 is a sectional view of the torque sensor shown in FIG. 4, showing flow of magnetic flux between magnets and teeth of the torque sensor.
Figure 7:
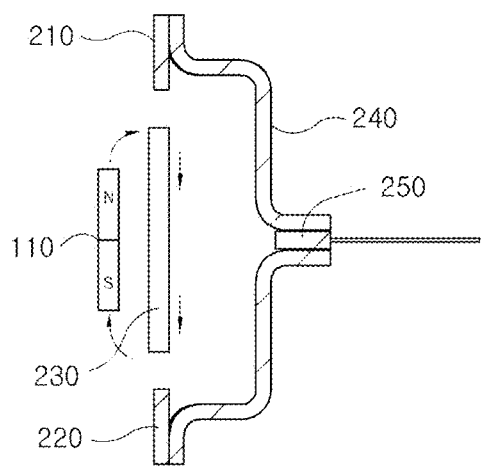
FIG. 7 is a sectional view of the torque sensor shown in FIG. 4, showing flow of magnetic flux between magnets and a shielding magnet body of the torque sensor.

The magnetic flux emitted from the N pole of the magnet 110 may be varied according to relative positions of the magnets 110, the teeth 210a and 220a of the stators 210 and 220, and the shielding magnetic body 230. FIG. 6 shows flow of magnetic flux when the magnets 110 overlap with the teeth 210a and 220a completely overlap, while FIG. 7 shows flow of magnetic flux when the magnets 110 completely overlap with the shielding magnetic body 230.

When the overlapping area between the magnets 110 and the teeth 210a and 220a is at a maximum, as shown in FIG. 6, the magnetic flux emitted from the N poles may flow to the collector unit 240 through the teeth 210a of the upper stator 210. The magnetic flux flowed to the collector unit 240 may be collected to the S poles through the teeth 220a of the lower stator 220. At this moment, the density of the magnetic flux detected in the collector unit 240 may be maximized. When the overlapping area between the magnets 110 and the shielding magnetic body 230 is at a maximum, as shown in FIG. 7, the magnetic flux emitted from the N poles flows to the shielding magnetic body 230 and then collected to the S poles. At this moment, the density of the magnetic flux detected in the collector unit 240 may be minimized.

That is, the density of the magnetic flux detected by the magnetic sensor 250 may be determined by a ratio of the overlapping area of the magnets 110 with respect to the teeth of the stators 210 and 220 and of the overlapping area of the magnets 110 with respect to the shielding magnetic body 230. Accordingly, the rotational deflection of rotor 100 and the stator 200 may be understood through a degree of the density of the magnetic flux detected by the magnetic sensor 250. Here, since the magnetic flux flowing through the magnetic sensor 250 flows in only one direction from the upper stator 210 to the lower stator 220, a hysteresis loss may be minimized.

Figure 8:
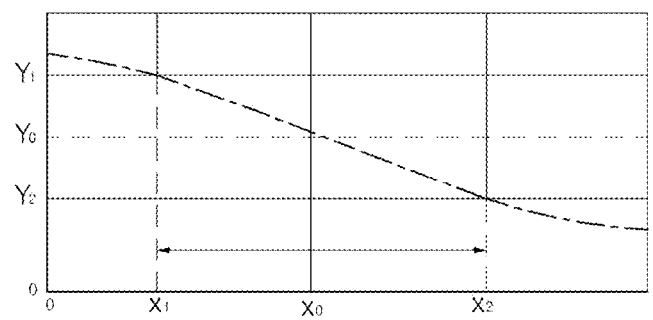
FIG. 8 is a graph showing a trend of rotational deflection according to the torsion of the steering column using the torque sensor according to the invention.

In FIG. 8, an X-axis denotes a torsion angle and a Y-axis denotes density of a magnetic flux detected by a magnetic sensor.

As shown in FIG. 8, the density of the magnetic flux and the torsion angle is inverse proportional to each other. In the graph, the density of the magnetic flux and the torsion angle form a linear line in a region from Y1 to Y2. The torsion angle correspondingly forms a linear line in a region from X1 to X2. Therefore, a rotor may be disposed so that the torsion angle is calculated by setting a central point XO of the linear region as a neutral angle. That is, it is exemplary that variation of the density of the magnetic flux, being detected by the magnetic sensor 250 is calculated by the rotational deflection of the rotor 100 and the stator 200, and the central point of the linear region is selected as the neutral angle.

Figure 9:
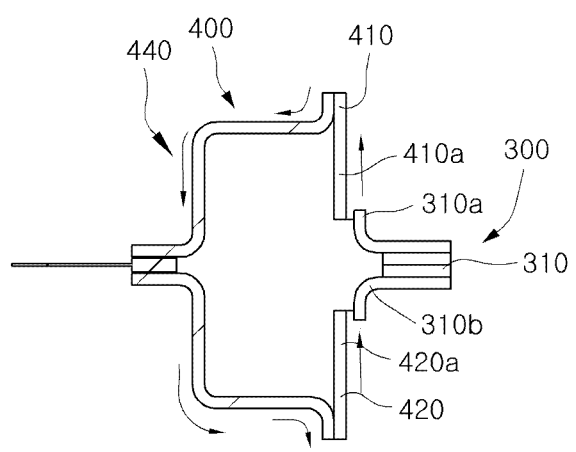
FIG. 9 is a sectional view another torque sensor according to the invention.

With respect to FIG. 9, another torque sensor according to the invention is shown and may include a rotor 300 (shown in FIGS. 10 and 11) and a stator 400 (shown in FIGS. 9, 10 and 11) mounted to an outside of the rotor 300.

The rotor 300 and the stator 400 may be connected to only any one of an input shaft (not shown) and an output shaft (not shown) being coaxially connected.

Figure 12:
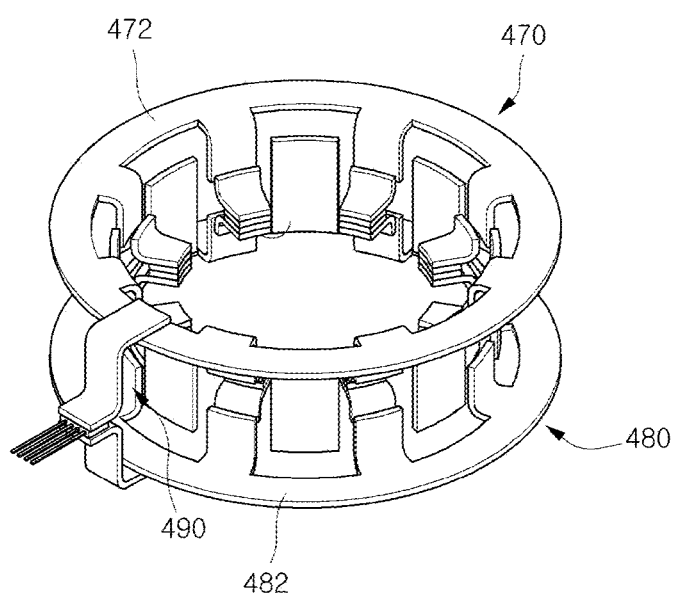
FIG. 12 is a perspective view of another torque sensor having a stator different form from the torque sensor of FIG. 9.

As shown in FIG. 9, the stator 400 may be coupled to and integrally rotated with any the input shaft or the output shaft. The stator 400 may be divided into an upper portion and a lower portion which are coaxially and separately arranged. That is, the stator 400 may include an upper stator 410 and a lower stator 420. The upper stator 410 and the lower stator 420 each include a plurality of teeth 410a and 420a, respectively, correspondingly extending toward each other. That is, the teeth 410a of the upper stator 410 extend downward while the teeth 420a of the lower stator 420 extend upward such that the teeth 410a and the teeth 420a face each other. A gap is provided between a free end of each of the teeth 410a of the upper stator 410 and a free end of each of the teeth 420a of the lower stator 420, the free ends facing each other. A shielding magnetic body 430 is mounted in the gap formed between the plurality of teeth 410a and 420a facing each other. The shielding magnetic body 430 induces the magnetic flux generated from magnets 310 that will be described later. Since the stators 410 and 420 and the shielding magnetic body 430 are insert molded using an insulating material, configuration set during manufacturing is not changed. Here, the stators 410 and 420 may include flanges 472 and 482, respectively, to increase current collection efficiency of a collector unit 440 provided at an upper portion of the stators 470 and 480, as shown in FIG. 12.

Additionally, a collector unit 440 is provided between the upper stator 410 and the lower stator 420 to magnetically connect the upper stator 410 and the lower stator 420 to each other. The collector unit 440 is connected to the upper stator 410 with one end and connected to the lower stator 420 with an opposite end, accordingly functioning as a magnetic path between the upper stator 410 and the lower stator 420. The collector unit 440 may include a magnetic sensor 450 to detect density of the magnetic flux flowing through the collector unit 440.

As shown in FIG. 9, the rotor 300 may be connected to and integrally rotated with the input shaft or the output shaft, which is not connected with the stator 400. The rotor 300 may include a plurality of the magnets 310 arranged at intervals corresponding to intervals of the teeth 410a and 420a respectively of the stators 410 and 420. Here, each of the magnets 310 is polarized along a vertical axis. According to the shown embodiment, in the magnet 310, an upper portion is an N pole and a lower portion is an S pole. Since the magnets 310 are insert molded using an insulating material, configuration set during manufacturing is not changed. Although the magnet 310 has the N pole at the upper portion and the S pole at the lower portion in this embodiment, positions of the N pole and the S pole may be reversed.

In addition, magnetic bodies 310a and 310b of an angle shape may be provided at the upper portion and the lower portion of the magnet 310, respectively. Here, the magnetic body 310a of the angle shape disposed at the upper portion of the magnet 310 may be bent upward to be parallel with the teeth 410a of the upper stator 410. The magnetic body 310b of the angle shape disposed at the lower portion of the magnet 310 may be bent downward to be parallel with the teeth 420a of the lower stator 420. Therefore, the magnetic flux emitted from the N poles of the magnets 310 may be induced by the magnetic bodies 310a and 310b of the angle shape and collected to the S poles. Consequently, the magnetic loss may be minimized.

Figure 10:
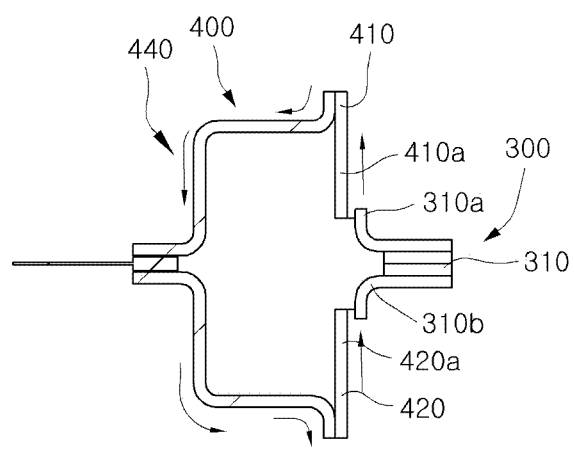
FIG. 10 is another sectional view of the torque sensor of FIG. 9 showing flow of magnetic flux between magnets and teeth of the torque.
Figure 11:
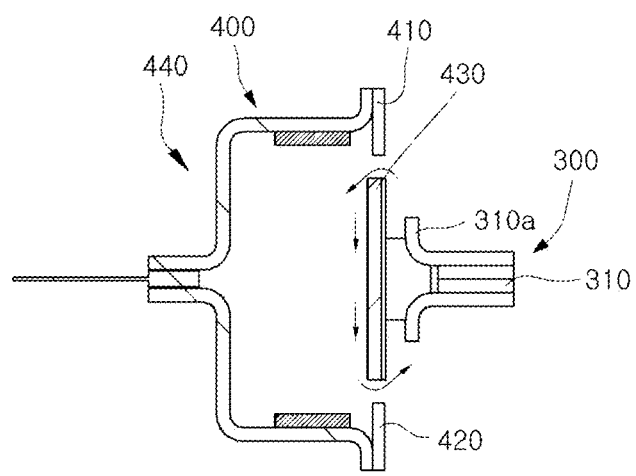
FIG. 11 is a sectional view illustrating a flow of a magnetic flux in a state in which an overlapping area between the magnets and a shielding magnetic body of the torque sensor according to the first embodiment of the present invention is maximum.

The magnetic flux emitted from the N pole of the magnet 310 may be varied according to relative positions of the magnets 310, the teeth 410a and 420a of the stators 410 and 420, and the shielding magnetic body 430. As shown in FIG. 10, a flow of the magnetic flux is present in an overlapping area between the magnets 310 and the teeth 410a and 420a. Similarly, as shown in FIG. 11, a flow of the magnetic flux is also present in an overlapping area between the magnets 310 and the shielding magnetic body 430.

When the overlapping area between the magnets 310 and the teeth 410a and 420a is at a maximum, as shown in FIG. 10, the magnetic flux emitted from the N poles may flow to the collector unit 440 through the magnetic body 310a of the angle shape disposed at the upper portion of the magnet 310 and the teeth 410a of the upper stator 410. The magnetic flux flowed to the collector unit 440 may be collected to the S poles through the teeth 420a of the lower stator 420 and the magnetic body 310b of the angle shape disposed at the lower portion of the magnet 310. At this moment, the density of the magnetic flux detected in the collector unit 440 may be maximized. When the overlapping area between the magnets 310 and the shielding magnetic body 430 is at a maximum, as shown in FIG. 11, the magnetic flux emitted from the N poles flows to the shielding magnetic body 430 through the magnetic body 310a of eth angle shape disposed at the upper portion of the magnet 310. The magnetic flux flowed to the shielding magnetic body 540 may be collected to the S poles through the magnetic body 310b of the angle shape disposed at the lower portion of the magnet 310. At this moment, the density of the magnetic flux detected in the collector unit 440 may be minimized.

That is, the density of the magnetic flux detected by the magnetic sensor 450 may be determined by a ratio of the overlapping area of the magnets 310 with respect to the teeth of the stators 410 and 420 and of the overlapping area of the magnets 410 with respect to the shielding magnetic body 430. Accordingly, the rotational deflection of rotor 300 and the stator 400 may be understood through a degree of the density of the magnetic flux detected by the magnetic sensor 450. Since the magnetic flux flowing through the magnetic sensor 450 flows in only one direction from the upper stator 410 to the lower stator 420, a hysteresis loss may be minimized.

Now with respect to FIG. 13-15, another torque sensor according to the invention will be described. As shown, the torque sensor may include a rotor 500 (shown in FIGS. 14 and 15) and a stator 600 (shown in FIGS. 14 and 15) mounted to an outside of the rotor 500.

The rotor 500 and the stator 600 may be connected to an input shaft (not shown) or an output shaft (not shown) being coaxially connected.

Figure 13:
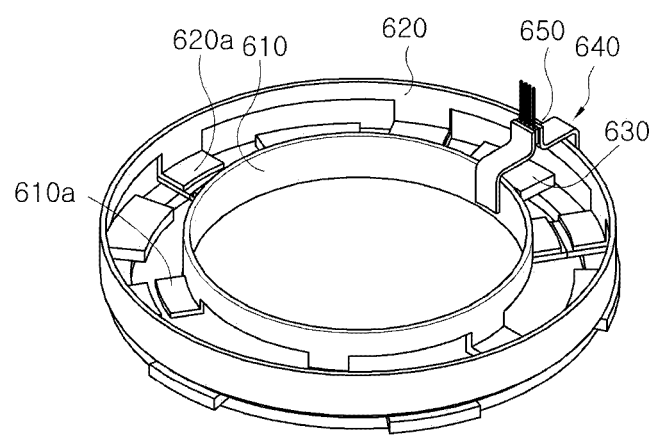
FIG. 13 is a perspective view of another a torque sensor according to the invention.

As shown in FIG. 13, the stator 600 may be coupled to and integrally rotated with any the input shaft or the output shaft. The stator 600 may be divided into an inside and an outside with respect to a circumferential direction and arranged coaxially and coplanar. That is, the stator 600 may include an inner stator 610 and an outer stator 620. The inner stator 610 and the outer stator 620 each include a plurality of teeth 610a and 620a, respectively, which are bent and extended toward each other. That is, the teeth 610a of the inner stator 610 extend outward while the teeth 620a of the outer stator 620 extend inward such that the teeth 610a and the teeth 620a face each other. A gap is provided between a free end of each of the teeth 610a of the upper stator 610 and a free end of each of the teeth 620a of the lower stator 620, the free ends facing each other. A shielding magnetic body 630 is mounted in the gap formed between the plurality of teeth 610a and 620a facing each other. The shielding magnetic body 630 induces the magnetic flux generated from magnets 510 that will be described later. Since the stators 610 and 620 and the shielding magnetic body 630 are insert molded using an insulating material, configuration set during manufacturing is not changed.

Additionally, a collector unit 640 is mounted between the inner stator 610 and the outer stator 620 to magnetically connect the stators 610 and 620 to each other. The collector unit 640 is connected to the inner stator 610 with one end and connected to the outer stator 620 with an opposite end, accordingly functioning as a magnetic path between the inner stator 610 and the outer stator 620. The collector unit 640 may include a magnetic sensor 650 to detect density of the magnetic flux flowing through the collector unit 640.

As shown, the rotor 500 may be connected to and integrally rotated with the input shaft or the output shaft, which is not connected with the stator 600. The rotor 500 may include a plurality of the magnets 510 arranged at intervals corresponding to intervals of the teeth 610a and 620a respectively of the stators 610 and 620. Here, each of the magnets 510 is polarized into an inside and an outside with respect to a circumferential direction. According to the shown embodiment, in the magnet 510, an inner portion is an N pole and an outer portion is an S pole. Since the magnets 510 are insert molded using an insulating material, configuration set during manufacturing is not changed. Although the magnet 510 has the N pole at the outer portion and the S pole at the inner portion in this embodiment, positions of the N pole and the S pole may be reversed.

The magnetic flux emitted from the N pole of the magnet 510 may be varied according to relative positions of the magnets 510, the teeth 610a and 620a of the stators 610 and 620, and the shielding magnetic body 630. As shown in FIG. 14, a flow of the magnetic flux is shown when the magnets 510 overlap with the teeth 610a and 620a. As shown in FIG. 15, a flow of the magnetic flux is shown when the magnets 510 overlaps the shielding magnetic body 630.

Figure 14:
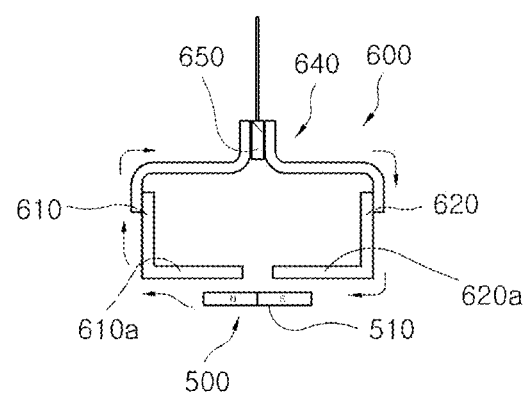
FIG. 14 is a sectional view of the torque sensor of FIG. 13 showing flow of magnetic flux between magnets and teeth of the torque sensor.
Figure 15:
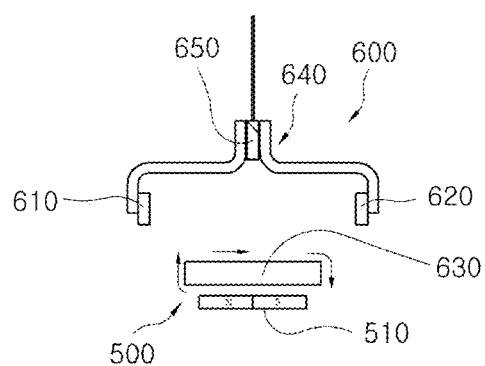
FIG. 15 is a sectional view of the torque sensor of FIG. 13 showing flow of magnetic flux between magnets and the shielding magnetic body of the torque sensor.

When the overlapping area between the magnets 510 and the teeth 610a and 620a is at a maximum, as shown in FIG. 14, the magnetic flux emitted from the N poles may flow to the collector unit 640 through the teeth 610a of the inner stator 610. The magnetic flux flowed to the collector unit 640 may be collected to the S poles through the teeth 620a of the inner stator 620. At this moment, the density of the magnetic flux detected in the collector unit 640 may be maximized. When the overlapping area between the magnets 510 and the shielding magnetic body 630 is at a maximum, as shown in FIG. 15, the magnetic flux emitted from the N poles flows to the shielding magnetic body 630 and then collected to the S poles. At this moment, the density of the magnetic flux detected in the collector unit 240 may be minimized.

That is, the density of the magnetic flux detected by the magnetic sensor 650 may be determined by a ratio of the overlapping area of the magnets 510 with respect to the teeth of the stators 610 and 620 and of the overlapping area of the magnets 510 with respect to the shielding magnetic body 630. Accordingly, the rotational deflection of rotor 500 and the stator 600 may be understood through a degree of the density of the magnetic flux detected by the magnetic sensor 650. Here, since the magnetic flux flowing through the magnetic sensor 650 flows in only one direction from the inner stator 610 to the outer stator 620, a hysteresis loss may be minimized.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A torque sensor, comprising:
   a rotor having a plurality of magnets;
   a stator having a plurality of teeth respectively corresponding to the plurality of magnets;
   a shielding magnetic body provided between the plurality of teeth and spaced apart from the plurality of teeth; and
   a magnetic flux provided by the plurality of magnets and the plurality of teeth or the shielding magnetic body and flowing in one direction.

2. The torque sensor of claim 1, wherein a density of the magnetic flux is maximized when the plurality of magnets completely overlap the plurality of teeth.

3. The torque sensor of claim 1, wherein the stator includes an upper portion and a lower portion.

4. The torque sensor of claim 3, wherein a first half of the plurality of teeth extend from the upper portion.

5. The torque sensor of claim 4, wherein a second half of the plurality of teeth extend from the lower portion and extend toward the first half.

6. The torque sensor of claim 3, further comprising a collector unit magnetically connecting the upper portion and the lower portion.

7. The torque sensor of claim 6, wherein the collector unit includes a magnetic sensor to detect a density of the magnetic flux.

8. The torque sensor of claim 1, wherein the stator includes a flange that extends outward from a center of the stator.

9. The torque sensor of claim 1, wherein the plurality of magnets are polarized along a vertical axis of the rotor.

10. The torque sensor of claim 9, further comprising a magnetic body mounted to an upper portion and a lower portion of the plurality of magnets to induce the magnetic flux.

11. The torque sensor of claim 10, wherein the magnetic flux emits from N poles of the plurality of magnets and is collected by S poles of the plurality of magnets through the stator.

12. The torque sensor of claim 1, wherein the stator includes an inside body and an outside body receiving the inside body.

13. The torque sensor of claim 12, wherein a first half of the plurality of teeth are positioned along the inside body and the second half of the plurality of teeth are positioned along the outside body.

14. The torque sensor of claim 13, wherein the first half extends toward the second half.

15. The torque sensor of claim 14, further comprising a collector unit magnetically connecting the inside body and the outside body.

16. The torque sensor of claim 15, wherein the collector unit includes a magnetic sensor to detect a density of the magnetic flux.

17. A torque sensor for measuring torsion of a steering column having an input shaft and an output shaft that are coaxially connected, comprising:
- a rotor unit positioned on one of the input shaft or the output shaft and having a plurality of magnets;
- a stator unit positioned on another of the input shaft or the output shaft with respect to the rotor unit and having a plurality of teeth respectively corresponding to the plurality of magnets; and
- a shielding magnetic body provided between the plurality of teeth and spaced apart from the plurality of teeth;
- such that the rotor unit and the stator unit or the shielding magnetic body provide a magnetic flux flowing in one direction.

18. The torque sensor of claim 17, wherein a density of the magnetic flux flowing between the rotor unit and the stator unit is maximized when the plurality of magnets fully correspond with the plurality of teeth.

19. The torque sensor of claim 17, wherein the stator unit is divided into an upper portion and a lower portion and the plurality of teeth a positioned on both the upper portion and the lower portion.

20. The torque sensor of claim 19, wherein the plurality of teeth positioned on the upper portion extend toward the plurality of teeth on the lower portion.

21. The torque sensor of claim 19, further comprising a collector unit to magnetically connect the upper portion and the lower portion.

22. The torque sensor of claim 21, wherein the collector unit includes a magnetic sensor to detect a density of the magnetic flux.

23. The torque sensor of claim 17, wherein the stator unit has a cross section bent outward.

24. The torque sensor of claim 17, wherein the plurality of magnets provided are polarized in a vertical direction.

25. The torque sensor of claim 24, further comprising an angle-shape magnetic body mounted to an upper portion and a lower portion of the plurality of magnets to induce the magnetic flux from N poles of the plurality magnets and collect on S poles of the plurality of magnets through the stator unit.

26. The torque sensor of claim 17, wherein the stator unit is divided into an inside and an outside with respect to a circumferential direction.

27. The torque sensor of claim 26, wherein the plurality of teeth are positioned on both the inside and the outside of the stator unit bend such that the plurality of teeth on the inside extend toward the plurality of teeth on the inside.

28. The torque sensor of claim 26, further comprising a collector unit to magnetically connecting the inside and the outside of the stator unit.

29. The torque sensor of claim 28, wherein the collector unit includes a magnetic sensor to detect a density of the magnetic flux.

30. The torque sensor of claim 26, wherein the plurality of magnets provided with the rotor unit are polarized into the inside and the outside of the stator unit with respect to the circumferential direction.

31. A method of measuring torsion of a steering column using a torque sensor, the method comprising:
- providing a rotor unit and having a plurality of magnets, and a stator unit having a plurality of teeth respectively corresponding to the plurality of magnets such that the rotor unit and the stator unit provide a magnetic flux flowing in one direction;
- detecting a variation of a density of the magnetic flux according to a rotational deflection of the rotor unit and the stator unit; and
- selecting a neutral angle as a central point of a linear region of the variation.

* * * * *